US010217101B2

(12) United States Patent
Jones et al.

(10) Patent No.: US 10,217,101 B2
(45) Date of Patent: *Feb. 26, 2019

(54) LINK OF MOBILE DEVICES TO FACILITATE MOBILE COMMERCE TRANSACTIONS

(71) Applicant: International Business Machines Corporation, Armonk, NY (US)

(72) Inventors: Angela R Jones, Durham, NC (US); Ruthie D Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 128 days.

This patent is subject to a terminal disclaimer.

(21) Appl. No.: 13/780,475

(22) Filed: Feb. 28, 2013

(65) Prior Publication Data
US 2013/0254100 A1    Sep. 26, 2013

Related U.S. Application Data

(63) Continuation of application No. 13/428,782, filed on Mar. 23, 2012.

(51) Int. Cl.
*G06Q 20/32*    (2012.01)

(52) U.S. Cl.
CPC ....... *G06Q 20/322* (2013.01); *G06Q 20/3278* (2013.01)

(58) Field of Classification Search
CPC .................................................... G06Q 40/00
See application file for complete search history.

(56) References Cited

U.S. PATENT DOCUMENTS

| 8,127,982 B1* | 3/2012 | Casey .................... G06Q 40/02 235/379 |
| 2002/0116329 A1* | 8/2002 | Serbetcioglu et al. ......... 705/39 |
| 2005/0086126 A1* | 4/2005 | Patterson ................ A63F 13/12 705/26.8 |

(Continued)

OTHER PUBLICATIONS

Smart Card Alliance, "The Mobile Payments and NFC Landscape: a U.S. Perspective", Sep. 2011, PC-11002 (Year: 2011).*

(Continued)

*Primary Examiner* — Bruce I Ebersman
*Assistant Examiner* — David P Sharvin
(74) *Attorney, Agent, or Firm* — North Shore Patents, P.C.; Michele Liu Baillie

(57) ABSTRACT

In linking mobile devices to facilitate a mobile commerce transaction, a primary mobile device creates an invitation to link to a mobile commerce account of the primary mobile device with a mobile commerce payment system and sends the invitation to a secondary mobile device. The secondary mobile device receives the invitation from the primary mobile device and sends an agreement to link to the mobile commerce account to the primary mobile device. The primary mobile device receives the agreement from the secondary mobile device and sends credentials for linking to the mobile commerce account to the secondary mobile device. The secondary mobile device receives the credentials from the primary mobile device and acquires information for enabling the link to the mobile commerce account using the credentials. The secondary mobile device links to the mobile commerce account using the information.

9 Claims, 3 Drawing Sheets

(56) References Cited

U.S. PATENT DOCUMENTS

| | | |
|---|---|---|
| 2007/0125840 A1* | 6/2007 | Law et al. .................. 235/379 |
| 2007/0250393 A1 | 10/2007 | Albret, Jr. et al. |
| 2008/0208743 A1 | 8/2008 | Arthur et al. |
| 2008/0250482 A1* | 10/2008 | Ahtisaari .......... G06F 17/30867 726/7 |
| 2009/0192935 A1* | 7/2009 | Griffin et al. .................. 705/41 |
| 2010/0125495 A1 | 5/2010 | Smith et al. |
| 2010/0299212 A1 | 11/2010 | Graylin et al. |
| 2011/0065420 A1 | 3/2011 | Reyes |
| 2012/0136732 A1* | 5/2012 | McMillen ............ G06Q 20/105 705/16 |

OTHER PUBLICATIONS

Sung, D., "What is Google Wallet?", http://www.pocket-lint.com/news/40217/what-is-google-wallet, May 27, 2011; all pages.

Rosenberg et al., "SIP: Session Initiation Protocol, RFC 3261", http://tools.ietf.org/html/rfc3261; Jun. 2006.

* cited by examiner

LINK OF MOBILE DEVICES TO FACILITATE MOBILE COMMERCE TRANSACTIONS

CROSS-REFERENCE TO RELATED APPLICATIONS

The present application relates to co-pending U.S. patent application Ser. No. 13/428,782, filed on Mar. 23, 2012.

BACKGROUND

Mobile commerce, or "M-Commerce", includes applications and services that are accessible from Internet-enabled mobile devices. In particular, M-Commerce provides the ability to use a mobile device to participate in financial transactions. Some M-Commerce services use the Near Field Communication (NFC) standard. Two NFC-enabled devices establish radio communication with each other by touching them together or bringing them into close proximity. An NFC-enabled mobile device may include an NFC chip, while another device may include an NFC chip reader. When the two devices come into close proximity, the NFC chip reader wakes up the NFC chip on the mobile device and establishes a communication link between them. Data may then be exchanged between the devices. For example, a merchant may provide a kiosk with an NFC chip reader. During a financial transaction, such as the purchase of consumer items, the mobile device user brings the NFC-enabled mobile device in close proximity to the kiosk so that the NFC chip reader in the kiosk may establish a communication link with the mobile device. Data is then exchanged between the user's mobile device and the kiosk, such as information for authentication and payment account information. Upon conclusion of the financial transaction, a paper or electronic receipt may be generated and provided to the user or the user's mobile device.

However, unlike a traditional commercial transaction, current M-Commerce applications do not provide a mobile device the ability to associate other mobile devices with the same m-commerce account. For example, it is common practice with traditional physical credit cards for a primary account owner to authorize additional users to charge to the same credit card account. This is not possible with current M-Commerce applications.

SUMMARY

According to one embodiment of the present invention, a method for linking mobile devices to facilitate a mobile commerce transaction, comprises: receiving, by a secondary mobile device, an invitation from a primary mobile device to link to a mobile commerce account of the primary mobile device with a mobile commerce payment system; in response to receiving the invitation, sending, by the secondary mobile device, an agreement to link to the mobile commerce account to the primary mobile device; receiving, by the secondary mobile device, credentials for linking to the mobile commerce account from the primary mobile device; and acquiring, by the secondary mobile device, information for enabling the link to the mobile commerce account using the credentials. The secondary mobile device further links to the mobile commerce account using the information. The link to the mobile commerce account may be configured by the primary mobile device to be persistent, active for a predetermined time duration, or active until a predetermined condition is met.

In one aspect of the present invention, the invitation comprises a message comprising an object containing: an identity of the primary mobile device or a primary mobile device owner; an identity of the secondary mobile device or a secondary mobile device owner; and a duration for which the link to the mobile commerce account is active.

In one aspect of the present invention, the primary mobile device receives a confirmation of an acceptance of the invitation from the secondary mobile device, and in response to receiving the confirmation, sends the credentials to link to the mobile commerce account to the secondary mobile device. The credentials may comprise a confirmation key acquired from the mobile commerce payment system by the primary mobile device.

In one aspect of the present invention, the secondary mobile device acquires the information from the mobile commerce payment system for enabling the link to the mobile commerce account using the credentials. The information for enabling the link to the mobile commerce account comprises mobile commerce account information provided by the mobile commerce payment system that securely associates the primary mobile device and the secondary mobile device.

According to another embodiment of the present invention, a method for linking mobile devices to facilitate a mobile commerce transaction, comprises: creating, by a primary mobile device, an invitation to link to a mobile commerce account of the primary mobile device with a mobile commerce payment system; sending, by the primary mobile device, the invitation to a secondary mobile device; receiving, by the primary mobile device, an agreement to link to the mobile commerce account from the secondary mobile device; in response to receiving the agreement, sending, by the primary mobile device, credentials for linking to the mobile commerce account to the secondary mobile device, wherein the secondary mobile device acquires information for enabling the link to the mobile commerce account using the credentials. The secondary mobile device further links to the mobile commerce account using the information.

In one aspect of the present invention, the link to the mobile commerce account is configured by the primary mobile device to be persistent, active for a predetermined time duration, or active until a predetermined condition is met.

In one aspect of the present invention, the invitation comprises a message comprising an object containing: an identity of the primary mobile device or a primary mobile device owner; an identity of the secondary mobile device or a secondary mobile device owner; and a duration for which the link to the mobile commerce account is active.

System and computer program products corresponding to the above-summarized methods are also described and claimed herein.

DETAILED DESCRIPTION

Figure 1:
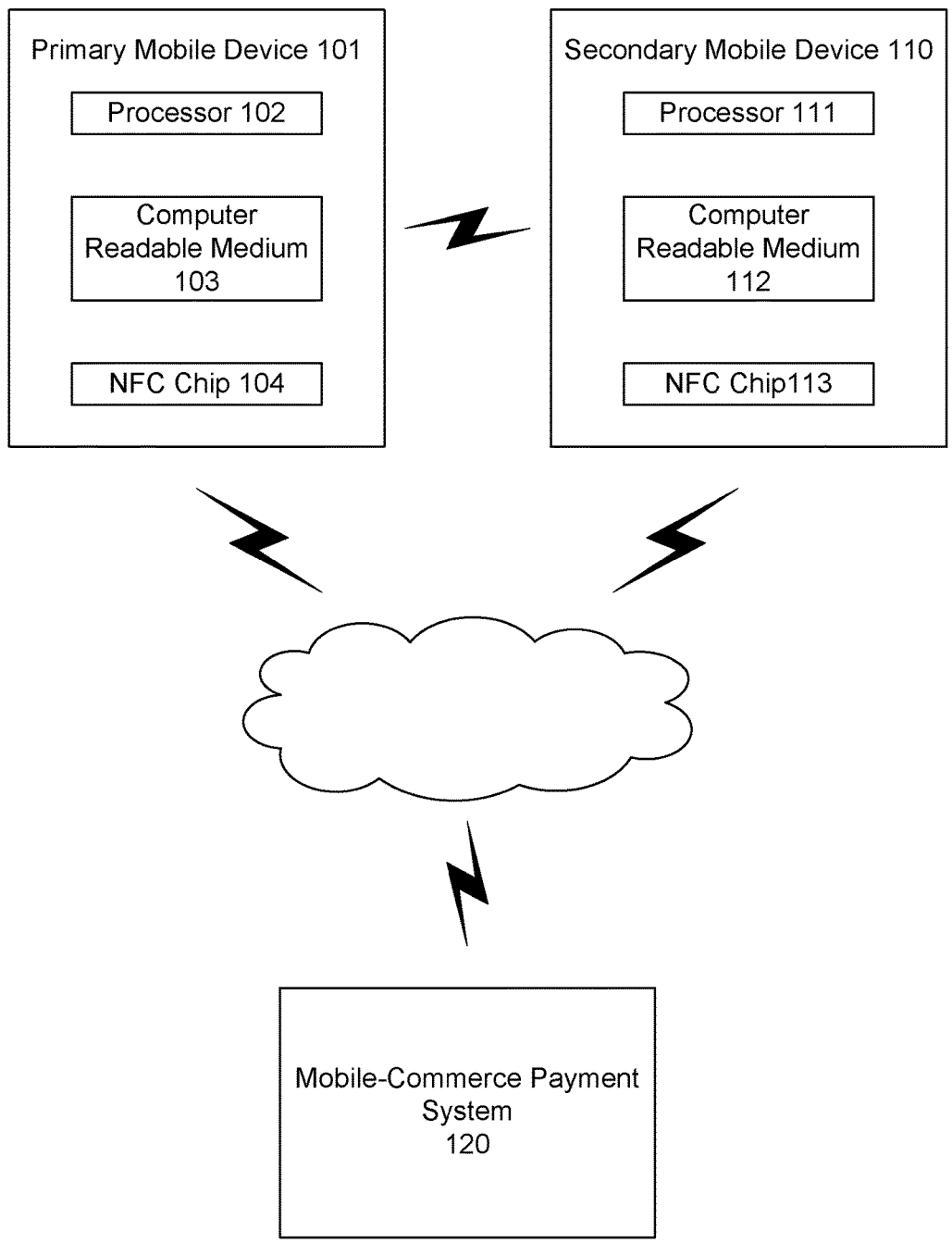
FIG. 1 illustrates an embodiment of a system for linking mobile devices to facilitate a mobile commerce transaction according to the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates an embodiment of a system for linking mobile devices to facilitate a mobile commerce transaction according to the present invention. The system comprises a primary mobile device 101 and a secondary mobile device 110. In this embodiment, both the mobile devices 101 and 111 are NFC-enabled devices, each comprising an NFC chip 104 and 113. The primary mobile device 101 is operationally coupled to a processor 102 and a computer readable medium 103. The secondary mobile device 110 is operationally coupled to a processor 111 and a computer readable medium 112. The computer readable media 103 and 112 of the devices 101 and 110 store computer readable program codes for implementing the various embodiments of the present invention, where the mobile devices 101 and 110 are linked to facilitate M-commerce transactions using a single M-commerce account. Here, the owner of the primary mobile device 101 holds an account with the M-commerce payment system 120. Using the present invention, the primary mobile device 101 is able to associate one or more secondary mobile devices 110 with the M-commerce account, such that the primary and secondary mobile device(s) 101 and 110 are able to charge to the same M-commerce account.

Figure 2:
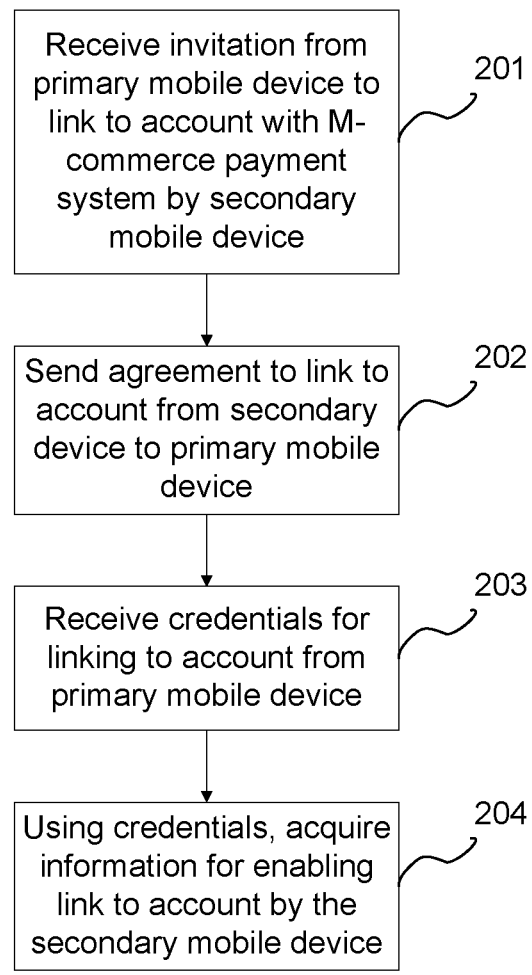
FIG. 2 is a flowchart illustrating an embodiment of a method for linking mobile devices to facilitate an M-commerce transaction according to the present invention.

FIG. 2 is a flowchart illustrating an embodiment of a method for linking mobile devices to facilitate an M-commerce transaction according to the present invention. The secondary mobile device 110 receives an invitation from the primary mobile device 101 to link to the primary mobile device's account with the M-commerce payment system 120 (201). The invitation from the primary mobile device 101 may be in response to a request from the secondary mobile device 110 to establish the link, or the invitation may be initiated at the primary mobile device 101. The secondary mobile device 110 sends an agreement to link to the M-commerce account to the primary mobile device 101 (202). In response, the secondary mobile device 110 receives credentials from the primary mobile device 101 for the secondary mobile device 110 to link to the primary mobile device's M-commerce account (203). In this embodiment, the credentials include data that allows the primary and secondary mobile device 101 and 110 to securely exchange contact information. The secondary mobile device 110, using the credentials, acquires information for enabling the link to the M-commerce account (204). The secondary mobile device 110 may link to the M-commerce account using the information. In this embodiment, the information includes M-commerce account information provided by the M-commerce payment system 120 that securely associates the primary and secondary mobile devices 101 and 110.

Figure 3:
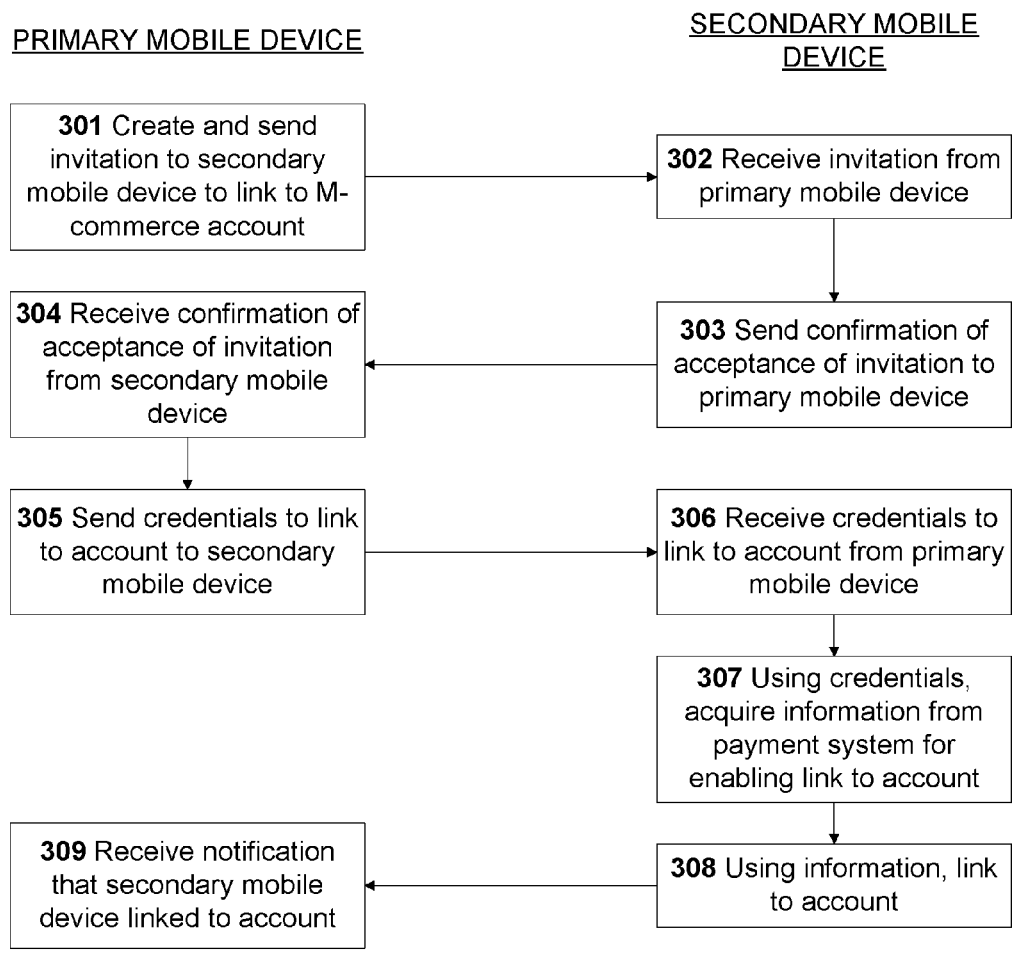
FIG. 3 is a flowchart illustrating in more detail an embodiment of the method for linking mobile devices to facilitate a mobile commerce transaction according to the present invention.

FIG. 3 is a flowchart illustrating in more detail an embodiment of the method for linking mobile devices to facilitate a mobile commerce transaction according to the present invention. In this embodiment, the functionality of M-commerce applications are extended to allow the primary mobile device owner to identify secondary mobile devices that the owner would like to link to the primary mobile device to establish a peer-to-peer infrastructure to facilitate purchases using one M-commerce account. The primary mobile device owner may cause the primary mobile device 101 to create the invitation by identifying the owner of the secondary mobile device 110, such as by specifying an actual name for the user of the secondary primary device 110 or a phone number of the secondary mobile device 110. The primary mobile device owner may configure the link to be persistent, temporal, or limited in some other manner. For example, the link may be configured to be active for a specified time duration, until a total purchase amount has been charged to the M-commerce account by the secondary mobile device 110, or when some other predetermined condition is met. Using these parameters inputting by the primary mobile device owner, the primary mobile device 101 creates and sends the invitation to the secondary mobile device 110 to link to the M-commerce account of the primary mobile device 101 (301). The invitation may be in the form of a specialized Short Message Service (SMS) that includes an embedded object containing information, such as the name of the user of the primary device 101 and the phone number of the primary mobile device 101, the name of the user of the secondary mobile device 110 and the phone number of the secondary mobile device 110, and the duration of the link. Other manners of sending the invitation may be used, including those that do not require a proximity link between the primary and second mobile devices 101 and 110, such as Email, Internet, etc.

The secondary mobile device 110 receives the invitation from the primary mobile device 101 (302). The invitation may then be displayed by the secondary mobile device 110, allowing the secondary mobile device owner to accept or reject the invitation. In response to receiving an input to accept the invitation from the secondary mobile device owner, the secondary mobile device 110 sends a confirmation of acceptance of the invitation to the primary mobile device 101 (303). The confirmation may be in the form of another SMS.

The primary mobile device 101 receives the confirmation of acceptance of the invitation from the secondary mobile device 110 (304), and in response, sends credentials to link to the M-commerce account to the secondary mobile device 110 (305). The confirmation may then be displayed by the primary mobile device 101, allowing the primary mobile device 101 to manage currently linked devices. In one embodiment, the credentials may be in the form of a confirmation key acquired from the M-commerce payment system 120 by the primary mobile device 101. Any type of confirmation key may be used. In another embodiment, a verification mechanism not involving the M-commerce payment system 120 may be used. For example, when the secondary mobile device 110 attempts to use the M-commerce account in a transaction, the secondary mobile device 110 may be required to obtain a confirmation from the primary mobile device before the transaction may be completed. Optionally, the credentials may be time dependent and required to be used within a prescribed period of time before rendered inactive.

The secondary mobile device 110 receives the credentials to link to the M-commerce account from the primary mobile device 101 (306). The secondary mobile device 110 uses the credentials to communicate with the M-commerce payment system 120 and acquire information from the M-commerce payment system 120 to enable the link to the M-commerce account of the primary mobile device 101 (307). Using the information, the secondary mobile device 110 links to the M-commerce account of the primary mobile device 101 (308). Per the configuration by the primary mobile device owner, as explained above, the link may be limited temporally, by total amount of charges, or some other parameter. Once the linking of the secondary mobile device to the primary mobile device's M-commerce account is completed, the primary mobile device may receive notification that the secondary mobile device 110 is linked to the M-commerce account (309).

When the secondary mobile device 110 attempts to charge to the M-commerce account, the M-commerce payment system 120 may determine whether the secondary mobile device 110 is authorized to access the M-commerce account according to the limitations. Alternatively, this determination may be made by the secondary mobile device 110 without requiring involvement of the M-commerce payment system 120. For example, when the link is configured to be active for a specified time period, the secondary mobile device 110 may disable the link once the time period expires. Once the M-commerce transaction is completed by the secondary mobile device 110, a copy of a receipt of M-commerce transaction may be made available to the primary mobile device 101, the secondary mobile device 110, the retailer, and/or the M-commerce payment system 120.

Others manners of disabling the secondary mobile device's link to the M-commerce account may be used. For example, when the link is configured to be persistent by the primary mobile device 101, the primary mobile device 101 may inform the M-commerce payment system 120 that the secondary mobile device 110 is no longer linked to the M-commerce account. The M-commerce payment system 120 may then block further access to the M-commerce account by the secondary mobile device 110. Alternatively, current applications to disable mobile devices, or to erase data on the mobile devices, may be extended to also disable the link on the secondary mobile device 110.

In the above described manner, the primary mobile device 101 may link a secondary mobile device 110 to the same M-commerce account without needing to send actual account information to the secondary mobile device 110. The secondary mobile device 110 may be allowed to charge to the M-commerce account without having access to the M-commerce account information itself.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of managing authorizations to use a mobile commerce account during a mobile commerce transaction, the method comprising:

creating, by a primary mobile device, an invitation to send to a secondary mobile device, wherein the invitation invites the secondary mobile device to link to a mobile commerce account that is associated with the primary mobile device, wherein the linking authorizes the secondary mobile device to access the mobile commerce account, wherein the linking establishes a peer-to-peer infrastructure to facilitate purchases using the mobile commerce account, wherein each of the primary mobile device and the secondary mobile device are Near Field Communication (NFC)-enabled devices, and wherein the primary mobile device and the secondary mobile device are both able to charge to the mobile commerce account without sharing mobile commerce account information between the primary mobile device and the secondary mobile device;

receiving, by the secondary mobile device, the invitation transmitted from the primary mobile device to the secondary mobile device, wherein the invitation is received on a second interface of the secondary mobile device;

in response to receiving the invitation, sending confirmation of acceptance of the invitation from the secondary mobile device to the primary mobile device, wherein the invitation is accepted by receiving input on the second interface;

in response to receiving, by the primary mobile device, confirmation of the acceptance of the invitation from the secondary mobile device, sending, from the primary mobile device to the secondary mobile device, credentials to link to the mobile commerce account that is associated with the primary mobile device, wherein the credentials do not contain the mobile commerce account information associated with the primary mobile device, and wherein the confirmation is received on a first interface of the primary mobile device, allowing the primary mobile device to manage a plurality of linked devices via the first interface;

in response to receiving, by the secondary mobile device, the credentials sent from the primary mobile device, using, by the secondary mobile device, the credentials to communicate with a mobile commerce payment system to acquire information from the mobile commerce payment system to enable the linking to the mobile commerce account associated with the primary mobile account;

after receiving the credentials from the primary mobile device and during an attempt to use the mobile commerce account in the mobile commerce transaction by the secondary mobile device, requesting a second confirmation, by the secondary mobile device from the primary mobile device, without involving the mobile commerce payment system;

if the second confirmation is received by the secondary mobile device from the primary mobile device, completing the transaction;

if the second confirmation is not received by the secondary mobile device from the primary mobile device, not completing the transaction, and allowing the secondary mobile device to disable the link to the mobile commerce account.

2. The method of claim 1, wherein the linking to the mobile commerce account is configured by the primary mobile device to be persistent, active for a predetermined time duration, active until a predetermined condition is met, or active based on a total amount of charges to the mobile commerce account.

3. The method of claim 1, wherein the invitation comprises a message comprising an object containing:
- an identity of the primary mobile device or a primary mobile device owner;
- an identity of the secondary mobile device or a secondary mobile device owner; and
- a duration for which the link to the mobile commerce account is active.

4. The method of claim 1, wherein the credentials comprise a confirmation key acquired from the mobile commerce payment system by the primary mobile device.

5. The method of claim 1, wherein the information to enable the linking to the mobile commerce account comprises: information provided by the mobile commerce payment system that securely associates the primary mobile device and the secondary mobile device.

6. The method of claim 1 wherein the primary mobile device creates and sends the invitation in response to a request from the secondary mobile device to link to a mobile commerce account that is associated with the primary mobile device.

7. The method of claim 1 wherein the secondary mobile device is required to use the credentials within a prescribed period of time before the credentials are rendered inactive.

8. The method of claim 1 wherein the secondary mobile device is required to obtain a transaction confirmation from the primary mobile device when the secondary mobile device attempts to use the mobile commerce account in a transaction.

9. The method of claim 1 wherein the invitation is in a format of at least one of:
- i) a Short Message Service (SMS);
- ii) an email; and
- iii) via the Internet.

* * * * *